United States Patent Office 3,441,578
Patented Apr. 29, 1969

3,441,578
PIGMENTS COMPRISING METAL DERIVATIVES
OF COMPLEX SCHIFF'S BASES
Peter Dimroth, Ludwigshafen (Rhine), Germany, assignor to Badische Anilin- & Soda-Fabrik Aktiengesellschaft, Ludwigshafen (Rhine), Germany
No Drawing. Filed May 2, 1967, Ser. No. 635,365
Int. Cl. C07f 3/08, 3/06, 15/04
U.S. Cl. 260—429    3 Claims

ABSTRACT OF THE DISCLOSURE

Aromatic 1-formyl-2-hydroxy compounds may be reacted with 1,2,4,5-tetraminobenzene to form new azines which are capable of forming metal complexes. The complexes containing zinc, manganese, nickel or cadmium are valuable pigments.

---

The present invention relates to new dyes having the general formula:

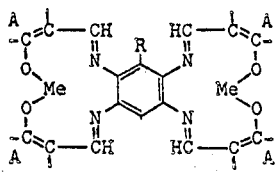

(I)

in which Me denotes one of the metals zinc, manganese, neckel or cadmium, A denotes a divalent aromatic radical which completes the grouping

to form the ring of benzene, bromobenzene, dibdomobenzene, chlorobenzene, dichlorobenzene, phenylazobenzene, naphthalene, naphthoic anilide, chloronaphthalene, bromonaphthalene, dibromonaphthalene, dimethylsulfonamidonaphthalene or nitronaphthalene, and R denotes a hydrogen atom, a chlorine atom, a methyl group or a cyano group.

Dyes having the Formula I in which the metal Me is zinc, nickel or cadmium, A is a divalent aromatic radical which completes the grouping

to form a naphthalene, bromonaphthalene or nitronaphthalene ring and R is a hydrogen atom are of particular technical interest.

The new dyes are obtained by reacting 1,2,4,5-tetraminobenzene derivatives having the general formula:

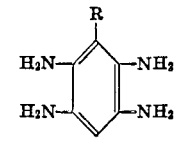

(II)

by conventional methods with aromatic formyl compounds having the general formula:

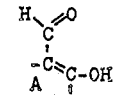

(III)

to form ozines having the general formula:

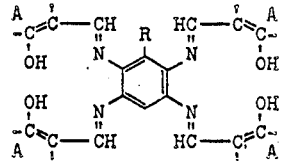

(IV)

A and R in Formulae II, III and IV having the same meanings as in Formula I, and by metallizing the hydroxyl groups with agents yielding zinc, manganese, nickel or cadmium by a conventional method. Examples of compounds having the Formula II are: 1,2,4,5-tetramino-3-methylbenzene, 1,2,4,5-tetramino-3-chlorobenzene and 1,2,4,5-tetramino-3-cyanobenzene.

Examples of aromatic formyl compounds having the general formula III are: 2-hydroxynaphthaldehyde, 5-bromosalicylaldehyde, 5-chlorosalicylaldehyde, 3,5-dibromosalicylaldehyde, 3,5-dichlorosalicylaldehyde, 5-phenylazosalicylaldehyde, 2-hydroxynaphthaldehyde-3, 1-formyl-2-hydroxy-3-naphthoic anilide, 2-hydroxy-6-bromonaphthaldehyde, 2-hydroxy-3,6-dibromonaphthaldehyde, 2-hydroxy-5-nitronaphthaldehyde, 1-hydroxy-2-formyl-4-chloronaphthalene, and 2-hydroxy-5-dimethylsulfonamidenaphthaldehyde.

The agents which supply zinc, manganese, nickel or cadmium are particularly metal salts of weak acids, for example the acetates, formates or carbonates. Mixtures of these salts, which may contain more than one of the said metals, may also be used, for example for the production of intermediate shades.

Production of the new dyes may be carried out for example by heating four moles of a formyl compound having the general Formula III with one mole of a tetraminobenzene having the general Formula II in the presence of one or more of the said agents which supply zinc, manganese, nickel or cadmium in an organic solvent. The new dyes are obtained direct by this reaction, which may also be carried out in the presence of an excess of the compound having the formula III. Examples of suitable solvents are formamide, dimethylformamide, N-methylpyrrolidone, butyrolactone and glycol monomethyl ether. The salts of the tetraminobenzenes, for example the hydrochlorides, may be used instead of the free amines. It is advantageous in this case to add the amount of an alkaline-reacting agent required to convert these salts into the amines. The agent supplying metal may be added in excess because the pigments may contain a proportion of free metal salt without detriment. This is particularly the case with the said metal carbonates.

The production of the new dyes may also be carried out by reacting four moles of formyl compound having the general Formula III with one mole of a 1,2,4,5-tetraminobenzene having the general Formula II in the said solvents in the absence of metal-supplying agents. In this case azines having the general Formula IV (which have not previously been described) are obtained and these may then be metallized with the agents supplying metal. It is advisable to exclude atmospheric oxygen during the production of the new dyes in order to avoid decreases in yield. The new dyes, once they have been made, are however no longer sensitive.

The new pigment dyes may be used in pastes, flush pastes, formulations, printing inks, distempers, size colors, binder paints and lakes of all kinds. The pigments may be incorporated into synthetic or natural macromolecular substances, such as polyvinyl chloride, polystyrene, polyamides, polyethylene, polypropylene, polyesters, phenolic resins, amino resins and rubber. The pigments may also be used for the mass coloring of fibers of cellulose acetate, polyacrylonitrile, polyesters, polyurethanes and polyvinyl chloride. They are also suitable for mass coloring of paper or for coloring inorganic substances, for example cement.

In the said substances, the new pigments are distinguished by high color strength and high resistance to solvents, fastness to weathering, fastness to light and resistance to high temperatures.

The invention is illustrated by the following examples in which parts are by weight.

EXAMPLE 1

172 parts of 2-hydroxynaphthaldehyde and 70 parts of 1,2,4,5-tetraminobenzene hydrochloride are stirred into 1700 parts of formamide at room temperature. Atmospheric oxygen is displaced by passing in nitrogen. 120 parts of anhydrous sodium acetate is then added and the mixture is heated for one hour at 60° C., two hours at 80° C. and four hours at 120° C. The residue is then suction-filtered while hot, washed with hot formamide, then with alcohol and finally with water and dried. 170 parts of a bluish green azine is obtained having the formula:

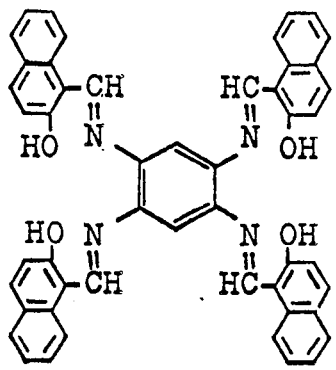

100 parts of this azine is heated in 1000 parts of formamide with 50 parts of zinc acetate for two hours at 90° C. and for five hours at 120° C. The residue is suction-filtered, washed with hot formamide and hot alcohol and dried. 98 parts of a red violet pigment is obtained which has the formula:

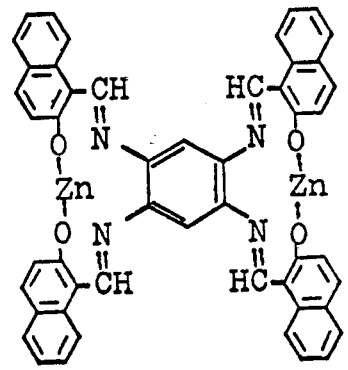

EXAMPLE 2

110 parts of salicylaldehyde and 70 parts of 1,2,4,5-tetraminobenzine hydrochloride are heated in 700 parts of formamide under a nitrogen atmosphere with 120 parts of anhydrous sodium acetate for one hour at 80° C. and for three hours at 110° C. The product is suction-filtered and washed with alcohol and water. 86 parts of an orange azine is obtained having the formula:

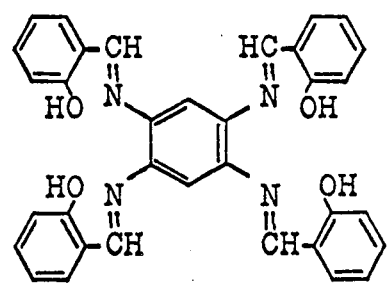

100 parts of this azine is heated under nitrogen in 1000 parts of formamide with 100 parts of zinc acetate for three hours at 110° C. The residue is suction-filtered and washed with cold formamide and cold alcohol. 96 parts of the analogous zinc complex is obtained in the form of an orange powder.

EXAMPLE 3

172 parts of 2-hydroxynaphthaldehyde, 70 parts of 1,2,4,5-tetraminobenzene hydrochloride and 2400 parts of dimethylformamide have 200 parts of tributylamine and 185 parts of anhydrous zinc acetate added to them and the whole is stirred for one hour at room temperature, for two hours at 80° C. and for three hours at 110° C. The residue is suction-filtered while hot, washed with hot dimethyl formamide, with alcohol and with water. 168 parts of the red violet pigment described in Example 1 is obtained.

EXAMPLE 4

The procedure of Example 1 is followed but the amounts of metal acetate given in the following Table 1 are used instead of 50 parts of zinc acetate. The corresponding pigments containing manganese, cadmium and nickel are obtained in the amounts and having the colors given in Table 1.

TABLE 1

| Acetate of— | Parts of acetate | Parts of pigment | Color of pigment |
|---|---|---|---|
| (a) Manganese | 50 | 98 | Violet. |
| (b) Cadmium | 65 | 99 | Do. |
| (c) Nickel | 50 | 100 | Do. |

EXAMPLE 5

The procedure of Example 3 is followed but the amounts of aldehyde given in the following Table 2 are used instead of 172 parts of 2-hydroxynaphthaldehyde. The corresponding pigments are obtained in the amounts, and having the color, specified in Table 2.

TABLE 2

| Aldehyde | Parts of aldehyde | Parts of pigment | Color of pigment |
|---|---|---|---|
| (a) Cl—⌬(—CH=O)(—OH) | 156 | 110 | Red. |
| (b) Cl—⌬(—CH=O)(—OH), Br | 300 | 186 | Red. |
| (c) Cl—⌬(—CH=O)(—OH), Cl | 190 | 114 | Red. |
| (d) naphthalene with CH=O, OH, Br | 251 | 244 | Violet. |
| (e) naphthalene with CH=O, OH, SO$_2$N(CH$_3$)$_2$ | 279 | 211 | Red. |
| (f) naphthalene with CH=O, OH, C(=O)NH-phenyl | 291 | 218 | Violet. |
| (g) naphthalene with CH=O, OH, NO$_2$ | 217 | 172 | Red. |
| (h) phenyl—N=N—⌬(—CH=O)(—OH) | 226 | 184 | Orange red. |

EXAMPLE 6

The procedure of Example 3 is followed but the amounts of amine salt given in the following Table 3 are used instead of 70 parts of 1,2,4,5-tetraminobenzene hydrochloride. Corresponding pigments are obtained in the amounts, and having the colors, indicated in Table 3.

TABLE 3

| Amine salt | Parts of amine salt | Parts of pigment | Color |
|---|---|---|---|
| (a) 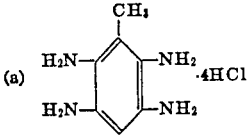 | 74 | 164 | Red violet. |
| (b) 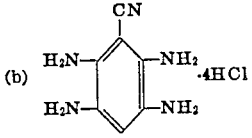 | 77 | 160 | Do. |
| (c) 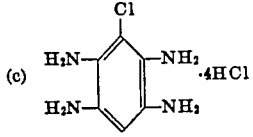 | 81 | 152 | Do. |

EXAMPLE 7

20 parts of the pigment obtained according to Example 3 is ground in the conventional way with linseed oil varnish in a three-roll mill. The printing ink prepared in this way gives prints having excellent strength of color, fastness to light, and brilliance when processed by the typographical and offset methods. When the pigments obtainable according to the examples set out in the following Table 4 are used for the production of this printing ink (instead of the said pigment), printing inks having the colors given in Table 4 are obtained.

TABLE 4

| Example: | Color |
|---|---|
| 4(a) | Violet |
| 4(b) | Violet |
| 4(c) | Violet |
| 5(a) | Red |
| 5(b) | Red |
| 5(c) | Red |
| 5(d) | Violet |
| 5(e) | Red |
| 5(f) | Red violet |
| 5(g) | Red |
| 5(h) | Orange red |
| 6(a) | Red violet |
| 6(b) | Red violet |
| 6(c) | Red violet |

EXAMPLE 8

3 parts of the pigment obtained according to Example 3 is ground in the conventional way with a nitrocellulose solution which contains 10 parts of nitrocellulose (soluble in alcohol and of low viscosity), 5 parts of dibutyl phthalate, 80 parts of a mixture (9:1) of ethyl alcohol and ethyl glycol. A deep-colored red violet intaglio printing ink is obtained which is suitable for the production of nonrunning prints having excellent fastness. Print pastes for example for textile printing, screen printing and the like, may also be obtained by appropriate modification.

EXAMPLE 9

A mixture of 70 parts of polyvinyl chloride, 30 parts of dibutyl phthalate and 1 part of titanium dioxide is colored by a conventional method with 0.5 part of a pigment prepared according to Example 3. A composition having a red violet color is obtained from which sheeting and sections can be prepared. The color is distinguished by excellent resistance to plasticizer and fastness to light.

By using in an analogous manner the pigments set out in the other examples, the shades of color indicated in the tables may be obtained with equivalent fastness properties.

EXAMPLE 10

1 part of polystyrene granulate is mixed in a mixing drum with 0.03 part of a pigment obtained according to Example 3. The mixture is then homogenized in an extruder. The extrudate is broken up in a cutting machine. Bluish red moldings having excellent fastness properties are obtained by means of an injection molding machine.

Polyethylene and polyamides may be colored in an analagous way. When pigments from other examples are used, the colors set out in the tables are obtained.

I claim:
1. A metal complex dye having the formula:

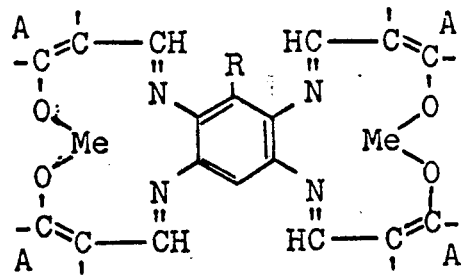

in which Me denotes one of the metals zinc, manganese, nickel and cadmium, A denotes a divalent aromatic radical which completes the grouping

to form a ring selected from the following rings: benzene, bromobenzene, dibromobenzene, chlorobenzene, dichlorobenzene, phenylazobenzene, naphthalene, naphthoic anilide, chloronaphthalene, bromonaphthalene, dibromonaphthalene, dimenthylsulfonamidonaphthalene and nitronaphthalene, and R is a substituent selected from the class consisting of a hydrogen atom, a chlorine atom, a methyl group and a cyano group.

2. The dye having the formula:

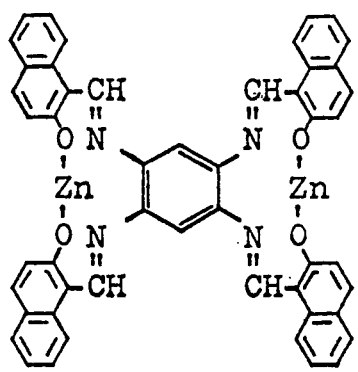

3. The dye having the formula:
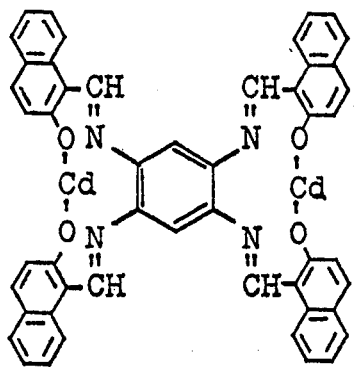
References Cited
UNITED STATES PATENTS
2,993,065  7/1961  Kumins et al. _____ 260—439
FOREIGN PATENTS
1,416,293  9/1965  France.
TOBIAS E. LEVOW, *Primary Examiner.*
A. P. DEMERS, *Assistant Examiner.*
U.S. Cl. X.R.
8—55, 57, 7; 106—22, 23, 26, 28, 97, 253, 288, 292, 301; 260—37, 41, 145, 429.9, 439, 764, 566